May 17, 1955    H. GREENSPON ET AL    2,708,285
BALL BEARING MOUNTING APPARATUS FOR SLIDING PANEL
Filed May 7, 1953

INVENTOR.
HENRY GREENSPON
LEONARD B. SIMONS
BY
Francis A. Utecht, Jr.
ATTORNEY

United States Patent Office 2,708,285
Patented May 17, 1955

2,708,285

BALL BEARING MOUNTING APPARATUS FOR SLIDING PANEL

Henry Greenspon and Leonard Blades Simons, Chicago, Ill.

Application May 7, 1953, Serial No. 353,624

2 Claims. (Cl. 16—88)

The present invention relates to mounting apparatus for use in connecting a sliding panel to a fixed member.

It is a major object of the present invention to provide novel mounting apparatus to be interposed between a sliding panel and a fixed member. Such sliding panel may take the form of a door, window, partition or the like.

A further object of the invention is to provide mounting apparatus for connecting a sliding panel to a fixed member, which apparatus incorporates a plurality of circulating ball elements so arranged that each ball will successively carry the weight of the panel.

It is another object of the present invention to provide mounting apparatus of the aforedescribed nature which utilizes a minimum number of parts and thereby results in a saving of weight and cost as compared to such heretofore proposed apparatus.

It is a further object to provide mounting apparatus of the aforedescribed nature which is adapted for use with panels disposed in either a vertical position or a position that is inclined to the verical.

An additional object is to provide mounting apparatus of the aforedescribed nature that is simple of design and rugged of construction, whereby it may have a long and trouble-free service life.

A more particular object of the present invention is to provide mounting apparatus of the aforedescribed nature which is not affected by the presence of dust or dirt.

These and other objects and advantages of the present invention will become apparent from the following detailed description, when taken in conjunction with the appended drawings wherein.

Figure 1:
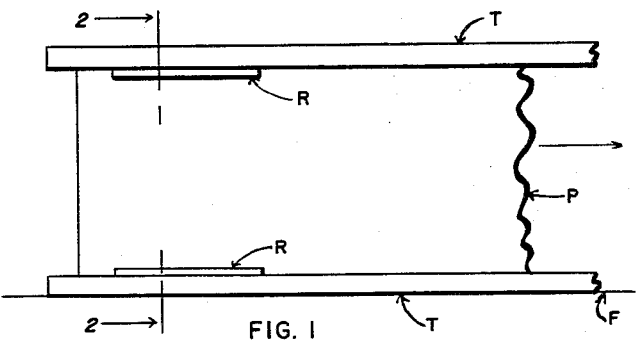
Figure 1 is a front elevational view of a sliding panel incorporating a preferred form of mounting apparatus embodying the present invention.

Referring now to the drawings, the preferred form of mounting apparatus is shown interposed between a fixed member F and a sliding panel P. This apparatus broadly comprises a channel-shaped track T mounted by the fixed member F below the panel; a retainer element R carried by the lower end of the panel; and a plurality of ball elements B disposed between the retainer element and the track. With special reference to Figures 1 and 2, both the upper and lower ends of the panel P may mount identical retainer elements R, while the fixed member may mount identical tracks T. Alternately, solely the lower end of the panel P may be provided with the special mounting apparatus, and conventional guide means may be provided for the upper end of the panel.

Figure 3:
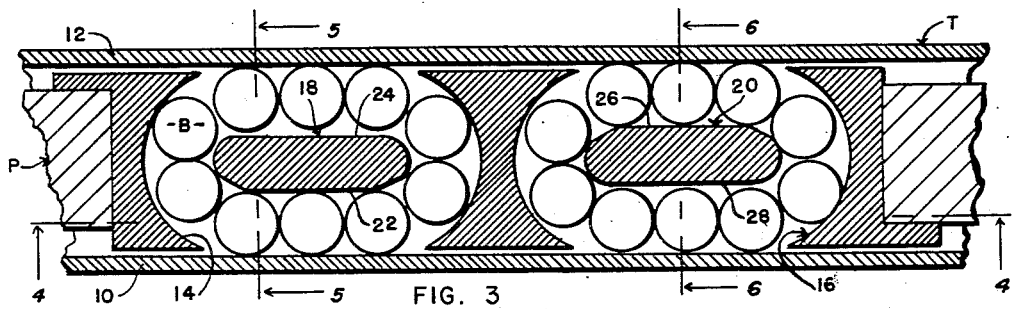
Figure 3 is an enlarged horizontal sectional view taken on line 3—3 of Figure 4.
Figure 4:
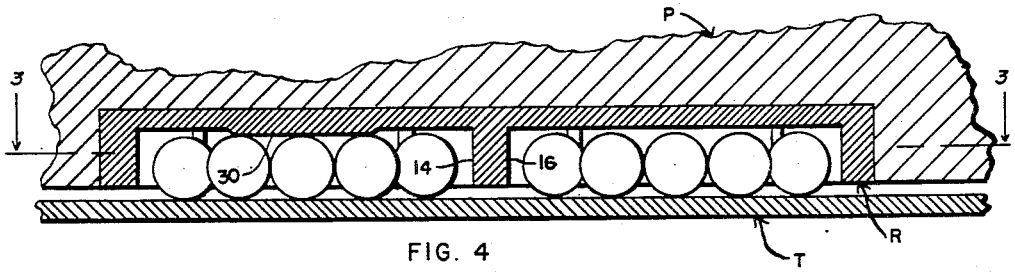
Figure 4 is a vertical sectional view taken on line 4—4 of Figure 3.
Figure 5:
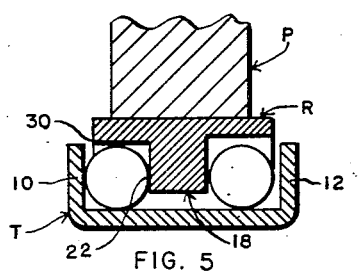
Figure 5 is a vertical sectional view taken on line 5—5 of Figure 3.
Figure 6:
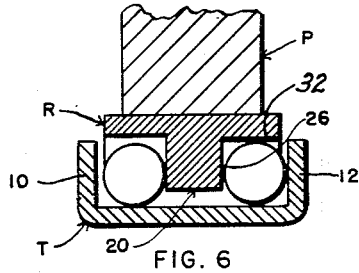
Figure 6 is a vertical sectional view taken on line 6—6 of Figure 3.

The track T is generally U-shaped in vertical cross-section and extends beyond the length of the panel P as far as the panel is to be moved. The panel P may be provided with as many retainer elements R as may be necessary. Ordinarily, however, one retainer element will be mounted at each end of the panel. Each retainer element R defines with the transversely-spaced sides 10 and 12 of the track T a pair of oval-shaped raceways 14 and 16 wherein are disposed the ball elements B. The center of each oval raceway 14 and 16 is defined by guides 18 and 20, respectively. With reference to Figures 3, 4, and 6, it should be particularly noted that one side 22 of the guide 18 is disposed closer to the track side 10 than the opposite side 24 thereof. Likewise, one side 26 of the guide 20 is disposed closer to the track side 12 than its opposite side 28 thereof. The guide sides 22 and 26 are disposed on opposite sides of the center line of the retainer element R. It should also be noted that the left portion of the retainer element R is formed with a depending projection 30 which extends downwardly into the raceway 14. The right portion of the retainer element is similarly formed with a depending projection 32, which extends into the raceway 16. With this arrangement, the balls B may always maintain the panel P centered between the sides 10 and 12 of the track T, as is clearly shown in Figures 5 and 6.

Figure 2:
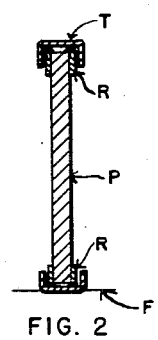
Figure 2 is a vertical sectional view taken on line 2—2 of Figure 1.

In the operation of the preferred form of the invention, the panel P may be moved to the right in Figures 1, 3 and 4, as indicated by the arrow in Figure 1. During such movement, the ball elements B disposed in raceway 14 will be caused to undergo circulation therein in a clockwise direction. This circulation results from the frictional engagement of the balls with the bottom and side 10 of the track T, and the guide side 22 and the underside of the projection 30. Such frictional engagement causes the balls originally positioned below the projection 30 to roll rearwardly in the raceway 14 and thereby force the other balls to replace them in such original position. In a similar manner, the balls disposed in the other raceway 16 will be caused to undergo counter-clockwise circulation in such raceway. The balls will thus successively carry the weight of the panel P and accordingly, they will wear at an equal rate.

With regard to the aforedescribed form of the invention, a considerable saving of weight and cost is effected because of the use of the track to define a portion of the oval-shaped raceways wherein the balls circulate. Although the present mounting apparatus is shown as being utilized with vertically positioned sliding panels, it will be apparent that it may also be utilized with panels that are in a position inclined to the vertical. Furthermore, while the mounting means of the present invention is herein shown and described with relation to a sliding panel, such mounting means may also be utilized in conjunction with other movable articles, such as elevators or the like. In this regard, it is to be understood that various modifications and changes may be made with respect to the detailed description appearing herein without departing from the spirit of the invention or the scope of the appended claims.

We claim:

1. Mounting apparatus to be interposed between a fixed member and a sliding panel, comprising: a longitudinally extending track having laterally spaced sides and adapted to be mounted by a fixed member; a retainer member adapted to be mounted by a panel, said retainer member being formed with a pair of longitudinally spaced passages, each of said passages cooperating with the sides of said track to define a generally oval-shaped raceway, the center of each raceway being defined by a guide, the side of one guide extending closer to the adjacent side of said track than the corresponding side of the other guide, and the opposite side of said other guide extending closer to the opposite side of said track than the corresponding side of said one guide; and, a depending projection extending downwardly into each of said raceways adjacent the sides of said guides that are spaced most proximate to the adjacent side of said track; and a plurality of balls disposed in each of said raceways and adapted upon longitudinal movement of said panel to be successively rolled between said projections and the side of said guides adjoining said projections, and said track, whereby said balls will collectively circulate about said raceways in opposite directions.

2. Mounting apparatus to be interposed between a fixed member and a vertically extending sliding panel, comprising: a horizontal longitudinally extending track that is generally U-shaped in vertical cross-section having laterally spaced sides and adapted to be mounted by a fixed member; a retainer member adapted to be mounted within an upwardly-extending recess formed in the lower portion of said panel, said retainer member being formed with a pair of longitudinally spaced passages, each of said passages cooperating with the laterally spaced sides of said track to define a generally oval-shaped, open-bottomed raceway, the center of each of said raceways being defined by a guide that integrally depends from the upper portion of said retainer members, the side of one guide extending closer to one side of said track than the corresponding side of the other guide, and the opposite side of the other guide extending closer to the opposite side of said track than the corresponding side of said first-mentioned guide; an integral projection depending from the upper portion of said retainer member into each of said raceways adjacent the sides of said guides that are spaced most proximate to the adjacent side of said track; and, a plurality of balls disposed in each of said raceways and adapted upon longitudinal movement of said panel relative to said track to be successively rolled underneath said projections and between the sides of said guides adjoining said projections and said track whereby said balls will collectively circulate about said raceways in opposite directions.

References Cited in the file of this patent

UNITED STATES PATENTS

| | | |
|---|---|---|
| 595,817 | Masterson | Dec. 21, 1897 |
| 613,527 | Richmond | Nov. 1, 1898 |
| 642,760 | Schanck | Feb. 6, 1900 |
| 719,951 | Norwood | Feb. 3, 1903 |
| 764,000 | Newell et al. | July 5, 1904 |
| 1,480,731 | Light et al. | Jan. 15, 1924 |
| 1,835,125 | Vegren et al. | Dec. 8, 1931 |